DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 6

T904,005
DIAZOTYPE COMPOSITION AND ELEMENT
James C. Fleming, Rochester, N.Y. 14617
Filed Nov. 3, 1971, Ser. No. 195,467
**Int. Cl. G03c *1/58***
U.S. Cl. 96—91 R
No Drawing. 22 Pages Specification

Diazotype compositions including a light-sensitive diazonium salt and a coupler compound that can react with the diazonium salt to form an azo dye, wherein the coupler is a 3-hydroxy-2-naphthanilide having the formula

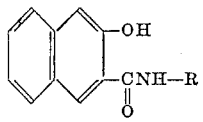

wherein R represents an aryl radical having a formula that is either

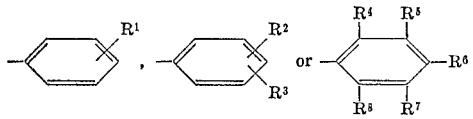

wherein $R^1$ represents a cyanomethyl group, a cyano group, a nitro group or an alkylsulfonyl group; $R^2$ represents a trihalomethyl group, a halogen atom or a nitro group; $R^3$ represents a halogen atom and each of $R^4$, $R^5$, $R^6$, $R^7$ and $R^8$ is the same and is a halogen atom, preferably fluoro, produce azo dyes of increased red light opacity on development. Particularly desirable such couplers include 4′-cyanomethyl-3-hydroxy-2-naphthanilide,
4′-chloro-3-hydroxy-3′-trifluoromethyl-2-naphthanilide,
2′,3′,4′,5′,6′-pentafluoro-3-hydroxy-2-naphthanilide,
3′-cyano-3-hydroxy-2-naphthanilide,
3′,4′-dichloro-3-hydroxy-2-naphthanilide,
3-hydroxy-4′-hydroxyethylsulfonyl-2-naphthanilide,
3-hydroxy-3′-nitro-2-naphthanilide,
4′-cyano-3-hydroxy-2-naphthanilide,
4′-chloro-3-hydroxy-3′-nitro-2-naphthanilide, or
3-hydroxy-4′-n-hexadecylsulfonyl-2-naphthanilide.